(No Model.)
D. RALSTON.
MACHINERY FOR SANDING BRICK MOLDS.
No. 334,610. Patented Jan. 19, 1886.
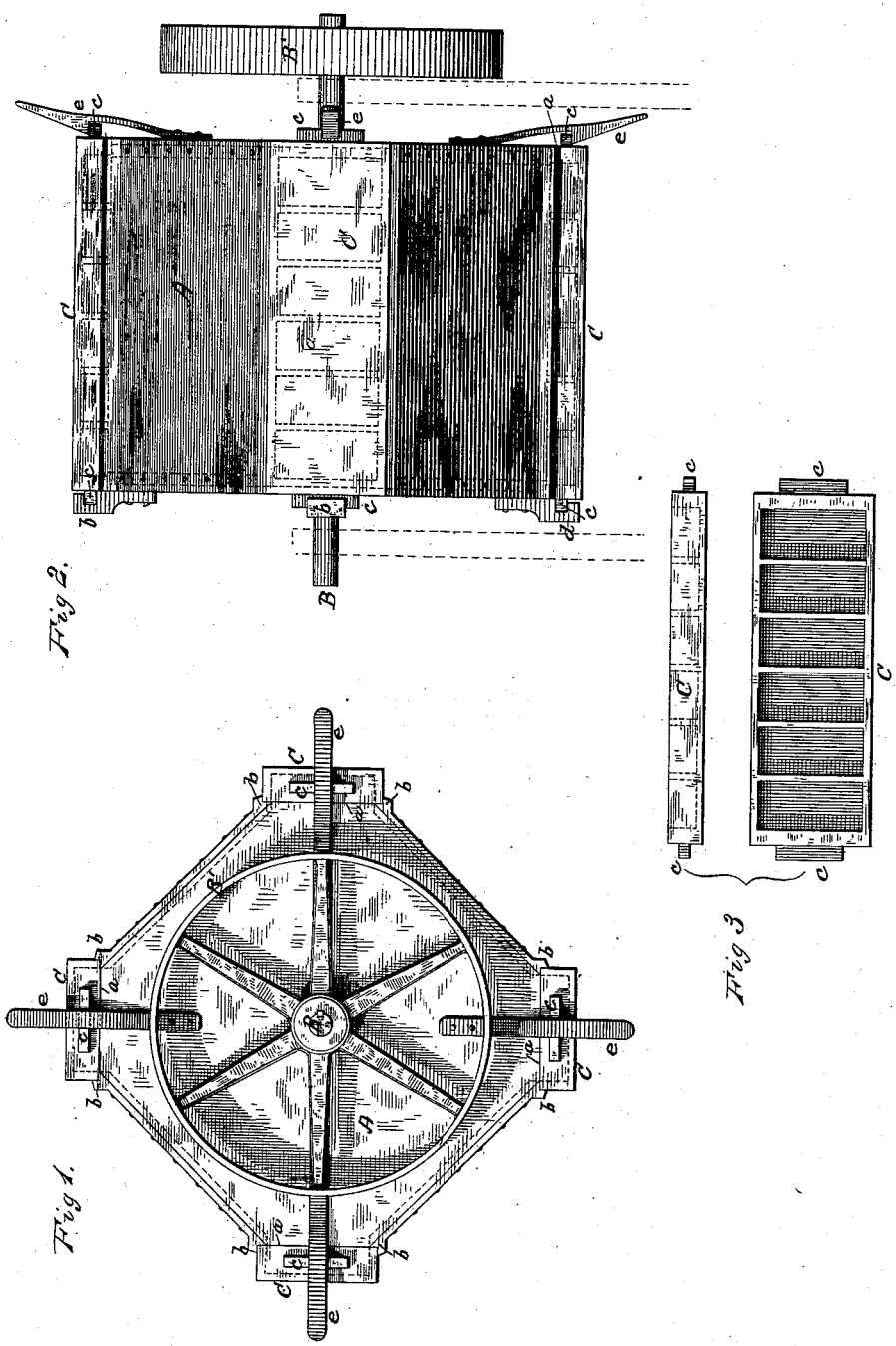
WITNESSES
Wm A. Skinkle
Harry King
INVENTOR
David Ralston
By his Attorney
M'Mullen Bailey

UNITED STATES PATENT OFFICE.

DAVID RALSTON, OF TROY, NEW YORK.

MACHINERY FOR SANDING BRICK-MOLDS.

SPECIFICATION forming part of Letters Patent No. 334,610, dated January 19, 1886.

Application filed October 27, 1882. Serial No. 75,259. (No model.)

*To all whom it may concern:*

Be it known that I, DAVID RALSTON, of Troy, in the county of Rensselaer and State of New York, have invented certain new and useful Improvements in Machinery for Sanding Brick-Molds, of which the following is a specification.

The machine which I have devised for sanding brick-molds can be used in brick-making, whether the bricks are machine-made or made by hand. I have, however, designed it more particularly for use in connection with brick-making machinery, and propose to obtain the power for driving it from some part of the brick-machine; but any suitable or convenient motive power may be employed.

It is not new to employ for the purpose of sanding brick-molds a sand-containing receptacle or drum mounted so as to be capable of rotary or oscillating movement, and provided with openings to which the molds are applied and held; but in all prior cases of which I have knowledge the mold-fastening devices have been connected to or have formed a part of the instrumentalities through the intermediary of which the power requisite to move the drum is applied, and consequently the drum must be stopped before the molds can be removed.

It is my object to so arrange the apparatus that the molds may be applied to and removed from the drum while the latter is in continuous rotation; and to this end I combine with the power-driven drum and the molds means for fastening said molds to the drum, so formed and arranged as to permit the molds at the proper times to be released and removed from and applied to the drum without interfering with its continuous movement, so that during the rotation of the drum those molds which are sanded can be successively removed and replaced by new ones, while the operation of sanding the other molds on the same drum is in progress.

The nature of my invention and the manner in which the same is or may be carried into effect can best be explained and understood by reference to the accompanying drawings, in which I have represented the preferred embodiment of my invention.

Figure 1 is a side elevation of the machine. Fig. 2 is a front elevation of the same. Fig. 3 represents in plan and side elevation one of the brick-molds.

A is the sand-containing and mold-receiving drum, made of any suitable material, and mounted and secured on a rotary shaft, B, which is to be driven by any suitable power. In this instance it is provided with a pulley, B', which is belted to some suitable part of the brick-machine in connection with which the sanding apparatus is used. The drum may be of any suitable dimensions and can be driven at any desired speed. In practice I make it about three feet in length and four feet in diameter, and speed it so that it shall make about three revolutions per minute. Extending lengthwise the drum are the openings $a$, four in number in the present instance, to which the molds C are applied. These openings are bounded lengthwise by guides $b$, which receive the side edges of the molds and support the latter.

To hold the molds in place, each mold is provided at each end with a projection, $c$. When the mold is fitted in place between the guides $b$, one of its projections $c$ passes under a stational retaining-flange, $d$, on the drum at one end of the opening $a$, and its other projection is caught and held by a spring-catch, $e$, on the drum at the opposite end of the opening $a$. This is one convenient form of retaining device; but other kinds of such devices can be substituted therefor, provided they are so arranged that while holding firmly in place the molds during the sanding operation they will, after completion of that operation, permit the sanded molds to be removed and replaced by others while the drum is continuously revolving.

The molds are applied to the openings bottom outward, so that their brick-molding compartments will communicate through the openings $a$ with the interior of the drum.

Supposing the drum to contain a suitable quantity of sand, and to be revolving in the direction of the arrow in Fig. 1, the operation is as follows: As the drum revolves, the molds in succession are carried down, and are thus filled with sand, after which, as they rise and are carried around, they are emptied of the sand, save only so much of the latter as can adhere to the moistened interiors of the molds. In this way each mold in succession is thoroughly sanded, after which it is removed from its opening $a$ and replaced by another, which is adjusted in place to close the openings before the drum revolves far enough to bring the opening sufficiently low to permit any sand to escape through it. The sanding operation can thus proceed continuously and expeditiously without intermitting the rotary movement of the drum.

Having now described my invention, I state in conclusion that while I have described the best way known to me of carrying the same into effect, I do not restrict myself to the particular mechanical details hereinbefore described, for it is manifest that the same can be conveniently varied; but

What I claim as new and of my invention is—

1. The combination of the rotary sand-containing drum formed with mold-receiving openings, as described, the molds, and mold-retaining devices, arranged and operating to permit the molds, after they are sanded, to be successively removed from the drum and replaced by others while the drum is continuously revolving, substantially as hereinbefore described.

2. The combination of the sand-containing drum formed with mold-receiving openings, the molds placed over and closing said openings, and spring-controlled latching or locking devices, whereby said molds are detachably held in place on said drum, substantially as hereinbefore set forth.

3. The sand-containing drum formed with mold-receiving openings bounded by mold-guides, in combination with the molds and the mold-retaining devices, consisting of spring latches or catches at one end of the drum and stationary holding-flanges at the other, substantially as and for the purposes hereinbefore set forth.

In testimony whereof I have hereunto set my hand this 25th day of October, 1882.

DAVID RALSTON.

Witnesses:
THOMAS GALVIN,
JAMES REMAN.